Dec. 16, 1947.  W. A. HYLAND ET AL  2,432,897
POWER LIFT FOR AGRICULTURAL IMPLEMENTS
Filed March 30, 1944   2 Sheets-Sheet 2
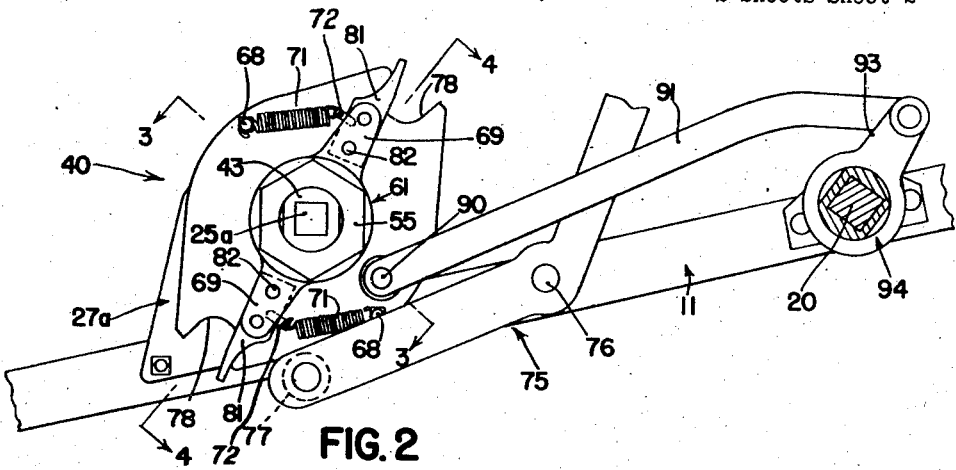
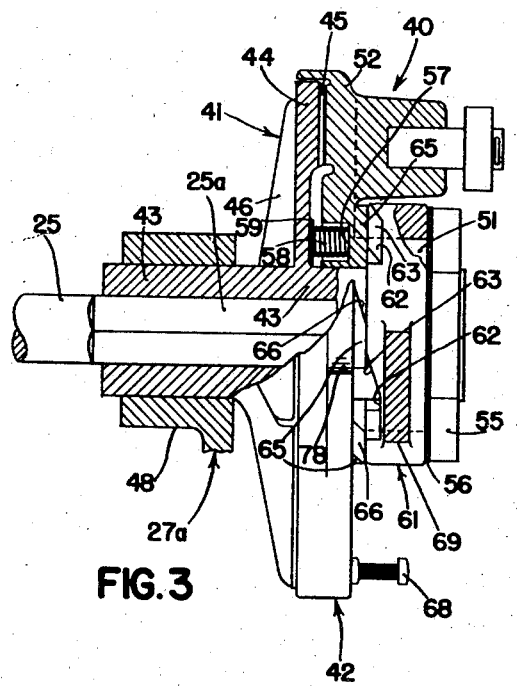
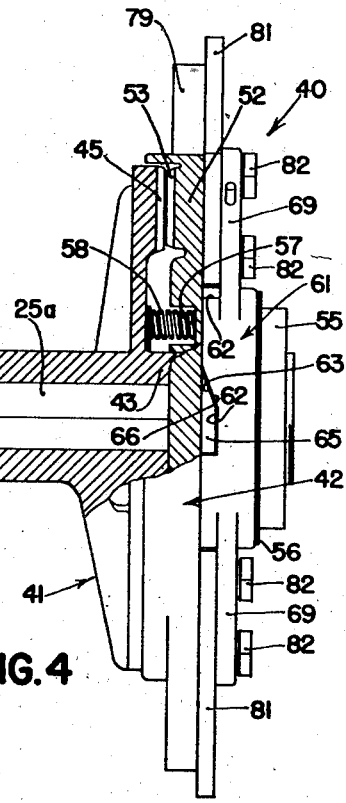
INVENTORS
WILLIAM A. HYLAND
JOHN H. STARR
ATTORNEYS Patented Dec. 16, 1947

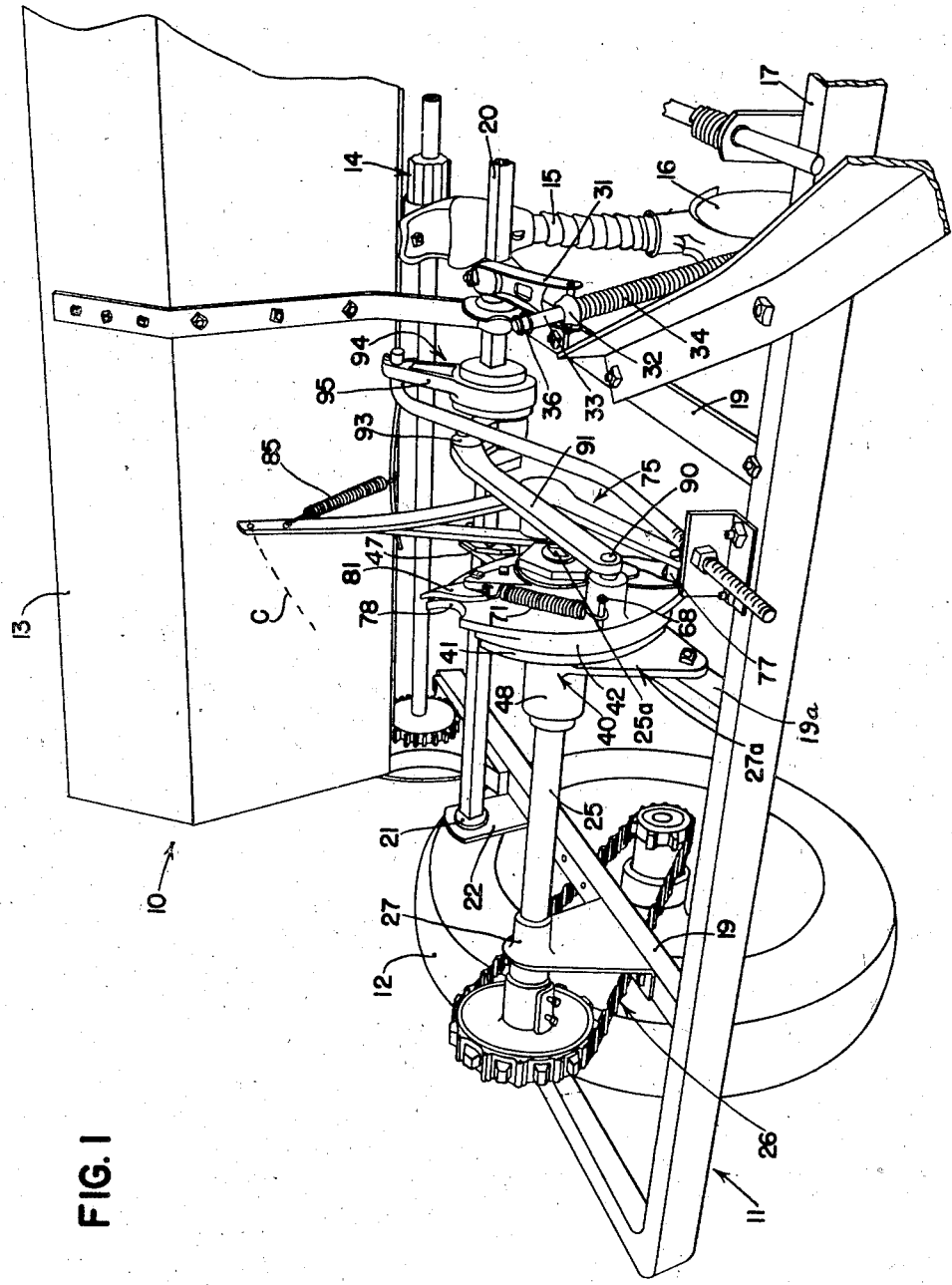

2,432,897

UNITED STATES PATENT OFFICE 2,432,897

POWER LIFT FOR AGRICULTURAL IMPLEMENTS

William A. Hyland, Horicon, and John H. Starr, Mayville, Wis., assignors to The Van Brunt Manufacturing Co., Horicon, Wis., a corporation of Wisconsin Application March 30, 1944, Serial No. 528,795

13 Claims. (Cl. 192—62)

1

The present invention relates generally to agricultural implements and more particularly to power lift units particularly adapted to raise tool means into a transport position and to lower the tool means into a lowered or working position.

The object and general nature of the present invention is the provision of a simple light weight type of power lift mechanism particularly adapted for such agricultural implements as grain drills or the like. More particularly, it is a feature of this invention to provide a simple power lift device in which the driven part may be driven in either direction in a positive manner so as to prevent the tools from dropping too hard when lowering them into operating position. An additional feature of this invention is the provision of a new and improved power lift device having a relatively small axial overall dimension so as to facilitate mounting the device between fairly closely spaced parts of the implement.

These and other objects and advantages of the present invention will be apparent to those skilled in the art after a consideration of the following detailed description, taken in conjunction with the accompanying drawings in which the preferred form of the present invention has been illustrated.

In the drawings:

Figure 1 is a perspective view of a portion of a grain drill in which the principles of the present invention have been incorporated.

Figure 2 is a side view of the power lift mechanism shown in Figure 1.

Figure 3 is a sectional view taken generally along the line 3—3 of Figure 2, the parts being shown in the positions they occupy when the driving and driven parts of the clutch are connected.

Figure 4 is a similar sectional view showing the parts in the positions they occupy when the driving and driven members of the clutch are disengaged.

Referring now more particularly to Figure 1, the grain drill in which the principles of the present invention have been incorporated is indicated in its entirety by the reference numeral 10 and includes a main frame 11 supported by ground wheels 12 and carrying a seed box 13, the latter being equipped with seed feeding devices 14 of conventional construction, discharging into seed tubes 15 which lead downwardly to disk furrow openers 16. The furrow openers 16 are connected with the front angle 17 of the frame 11 by means of drag bars, and the frame 11 also includes longitudinally extending frame bars 19 upon which a pressure shaft 20 is mounted, as by suitable bearings 21 supported by brackets 22 carried by the frame 11. Only the right-hand ground wheel is shown, and this wheel drives a shaft 25 through chain and sprocket means 26. The shaft 25 is supported by suitable bearing brackets 27 fixed to certain of the longitudinal frame bars 19. The pressure shaft 20 has fixed thereto a plurality of pressure arms 31, and each arm carries a swivel 32 through which a lift rod 33 extends. A compression spring 34 is disposed about each lift rod and bears at its lower end against a suitable abutment carried by the lift rod 33 or an associated part. The lower end of each lift rod 33 is connected with the associated drag bar, and a collar 36 is fixed to the upper end of each lifting rod 33 so that when the pressure arms 31 are rocked upwardly by appropriate rocking of the pressure shaft 20, all of the furrow openers are raised into their transport position. By rocking the pressure shaft 20 in the other direction, the furrow openers are lowered into their soil working position, and usually in this position the pressure shaft 20 is rocked through an extent sufficient to compress the springs 34 and thus force the furrow openers into the soil and hold them in their working position.

The present invention is not especially concerned with the particular details of the grain drill per se except in so far as the parts thereof cooperate with the particular kind of power lift mechanism which it is the object of the present invention to provide.

Referring now more particularly to Figures 2, 3 and 4, it will be seen that the drive shaft 25 is squared at its inner end, as at 25a, and is received within a self-interrupting clutch unit indicated in its entirety by the reference numeral 40. The self-interrupting clutch unit 40 includes a driving member 41 and a driven member 42 mounted in coaxial relation. Specifically, the driving member 41 includes an elongated hub section 43 and a flanged section 44, the latter having notches or serrations 45 on one face thereof and reenforcing webs 46 at the other side. The aperture through the hub 43 is square so as to fit non-rotatably on the end 25a of the drive shaft 25, and at one end the elongated hub section 43 is disposed within a bearing sleeve 48 formed on the inner bracket 27a. This supports the clutch 40 and also supports the inner end of the shaft 25. The bracket 27a is fixed to a frame bar 19a which at its forward end is fixed to the front frame angle 17 and at its rear end is supported by a bushing arrangement 47 on the pressure shaft 20.

The driven member 42 of the clutch 40 also includes a hub section 51 and a radial flange section 52, the latter having serrations 53 on the side thereof facing the serrations 45 on the driving member. The hub 51 of the driven clutch member 42 is mounted for rotation on the adjacent end of the hub 43 of the driving member. This end of the hub 43 is threaded so as to receive a nut 55 which, together with a thrust washer 56, serves as an abutment part, as will be described later. The driven member 42 of the clutch is provided with a plurality of spring pockets 57 in each of which a spring 58 is disposed. The outer end of each of the springs 58 bears against a thrust washer 59 which encircles the hub 43 of the driving clutch member 41. An additional thrust washer may be provided if desired, so that when relative rotation occurs between the driving and driven clutch members, there is no interference with the proper action of the springs 58. The function of the springs 58 is to keep the driving and driven members on the clutch separated and out of driving connection unless means is employed for overcoming the springs 58 and forcing the driven clutch member 42 into driving engagement with the driving clutch member 41.

In order to shift the driven clutch member 42 into driving engagement with the driving clutch member 41, we provide a cam member 61 disposed about the hub section 51 of the driven clutch member 42. As best shown in Figures 3 and 4, one side of the cam member 61 bears against the thrust washer 56, and at the other side the member 61 is provided with four cam notches 62 each of which is formed with an inclined cam face 63. Cam projections 65 are formed on the portion of the driven clutch member 42 adjacent the hub 51 thereof and each of these cam projections has an inclined or angled cam face 66. Thus, when the cam member 61 is turned into one position so as to cause the cam projections 65 to ride up along the angled cam faces 63 on the member 61, the latter reacts against the abutment member 55 and forces the driven clutch member 42 into engagement with the driving clutch member 41 against the tension exerted by the spring 58. When the cam member 61 is turned in the other direction so as to permit the cam projections 65 to ride down into the notches 62, the springs 58 separate the driving and driven clutch members and thus interrupt the transmission of the drive from the shaft 25 to the driven member 42 of the clutch.

As best shown in Figure 2, a pair of studs 68 are carried by the driven clutch member 42 and a pair of arms 69 are carried generally in diametrically opposite relationship by the hub of the cam member 61. A spring 71 is connected at one end to each stud 68 and at the other end to a stud 72 threaded into the associated arm 69. The springs 71 and associated parts are so arranged that the springs 71 exert a force sufficient to rotate the cam member 61 into a position to force the driving and driven clutch members into engagement against the bias exerted by the springs 58.

The clutch 40 is of the self-interrupting, half-revolution type in which, after the parts have been engaged and the clutch driven for approximately a half revolution, the disconnection of the clutch elements is automatically effected. This is accomplished in the present invention by means of a trip lever 75 which is pivotally mounted on the grain drill frame, as at 76, and at its lower end carries a roller 77 which is adapted to engage in either one or the other of a pair of notches 78 formed in diametrically opposite portions of the periphery of the driven clutch member 42. A trip arm 81 is fixed, as at 82, to each of the extensions 69 and are disposed, respectively, adjacent the notches 78. The relation of the parts is such that when the roller 77 is disposed within one of the notches 78, the roller engages the associated trip arm 81 and, reacting against the side of the notch in the driven clutch member, forces the cam member 61 to rotate a given amount against the tension of the springs 71 sufficient to permit the cam lugs 65 to engage in the cam notches 62, whereupon the driven clutch member 42 is disengaged from the driving clutch member 41. Also, the trip lever roller 77 occupying a position in a notch 78, serves also to positively retain the driven clutch member 42 against rotation in either direction. If, however, the lever 75 is rocked about its pivot 76, as by a pull on the cable C, the roller 77 will be removed from the notch 78, whereupon the springs 71 will swing the cam member 61 angularly and force the driven clutch member 42 into engagement with the driving clutch member, whereupon the driven clutch member 42 will be rotated until the other notch 78 comes into a position to receive the roller 77, providing the operator has released the cable C by this time. The lever 75 is urged in one direction by a spring 85 which is capable of exerting sufficient force to cause the roller 77 to drop directly into the notch 78 and to bear against the trip arm 81 with sufficient force to shift the cam member 81 against the bias exerted by the springs 71, whereupon, when the roller 77 is fully seated in the notch 78, the drive from the driving clutch member 41 to the driven clutch member 42 will be automatically interrupted.

A crank pin 90 is carried by the driven member 42 of the clutch and is connected through a link 91 to an arm 93 which is connected to the pressure shaft 20 through an actuating mechanism 94. The present invention is not especially concerned with the particular details of the actuating connection 94, the same preferably being identical with that shown in the co-pending application, Serial No. 528,794, filed of even date herewith by John H. Starr, to which reference may be had if necessary. Briefly, the actuating connection 94 includes parts so arranged that when the link 91 is thrust rearwardly, as by a half-revolution of the crank pin 90, the pressure shaft 20 is rocked in a direction to raise the tools, and a half-revolution of the driven clutch member 42 in the other direction will act through said actuating connection 94 to lower the tools and then subsequently disconnect the arm 93 from the pressure shaft 20 so that the reaction of the pressure springs 34 in holding the tools in the ground is taken, not by the clutch unit 40, but by the stationary member 95 of the actuating connection 94, as shown and claimed in the above-mentioned co-pending Starr application.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement, a lifting clutch of the self-interrupting type adapted to raise tool means or the like into a raised position, said clutch mechanism comprising coaxially mounted driving and driven parts, one of said parts being axially shiftable through a limited extent relative to the other, said parts having interengageable faces, spring means acting between said parts for normally separating said interengageable faces, a member mounted for movement on one of said parts and engageable with the other for moving said parts toward one another so as to cause engagement of said interengageable faces, spring means acting between said member and the part on which said member is mounted and tending to cause said parts to be engaged, and a trip lever engageable with said member for moving it relative to said one part so as to accommodate the separation of said parts by said first mentioned spring means, said trip lever also being engageable with said one part for holding it against rotation while in disengaged position.

2. Power lift mechanism comprising coaxially arranged driving and driven parts, one mounted for axial movement toward and away from the other and each having axially facing interengageable portions adapted to be interengaged when said one part is moved toward the other and disengaged when said part is moved away from the other part, a member mounted for rocking movement about the axis of said parts and acting when moved in one direction relative to one of said parts to connect said parts in driving relation by shifting said axially movable part toward the other part, spring means acting against said member tending to cause said member to be moved in said one direction, and a trip lever engageable with said rockable member for moving it in a position to release said parts and to hold the driven part against rotation.

3. In an agricultural implement, power lift mechanism comprising a driving part having an elongated hub section and a radially extending flange section, a driven part including a radially extending flange section and mounted on the elongated hub of said driving part, said driven part being axially shiftable on said hub section toward and away from the driving part to effect connection and disconnection of said parts through their radial flanges, abutment means on said elongated hub section at the end thereof adjacent said driven part, spring means acting between said parts for normally disconnecting their flanges, a member disposed between said abutment means and the driven part and acting to shift the latter axially for controlling the connection and disconnection of the driven part with the driving part, and means acting between said controlling member and said driven part when normally urging said parts into driving connection.

4. In an agricultural implement, power lift mechanism comprising a pair of coaxially arranged driving and driven parts, the driven member being shiftable axially relative to the driving member into and out of driving connection therewith, spring means acting between said members for normally separating them, a part mounted on the driven member and having abutting engagement with the portion of the driving member and cam engagement with the driven member, whereby relative movement between said part and said driven member acts to force the driven member into driving engagement with the driving member, and means for moving said part relative to said driven member.

5. The invention set forth in claim 4, further characterized by said part having opposite ends extending outwardly beyond the periphery of said driven member, spring means acting between each end portion of said part and said driven member for urging said part in a direction to cause said driving and driven members to engage, there being a notch in opposite portions of said driven member adjacent the ends of said part, and a trip lever biased to enter either of said notches and to act against the associated end of said part for moving it against said spring means into a position to permit said driving and driven members to disengage.

6. In an agricultural implement, power lift mechanism comprising a driving member having an elongated hub and a flange, a driven member mounted on one end of said hub and including a flange section, said flange sections including surfaces formed to engage one another in driving relation, a plurality of spring pockets formed in one of said members, springs disposed in said pockets and engageable with the other member, thereby tending to separate said members by moving the driven member axially along said one end of the hub of said driving member, said driven member also including a hub section, a rockable member mounted on said last mentioned hub section, cooperating cam means on said driven member and said rockable member, an abutment member carried by said one end of said elongated hub and disposed at the outer side of said rockable member, the latter reacting against said abutment member for forcing said driving and driven members into engagement by rocking movement of said rockable member, and means for controlling the position of said rockable member.

7. The invention set forth in claim 6, further characterized by a crank pin carried by said driven member and disposed radially outwardly of said hub section and extending axially beyond said one end of said elongated hub.

8. The invention set forth in claim 6, further characterized by means for supporting said driving and driven members including a bearing sleeve disposed about the other end of said elongated hub.

9. An agricultural implement comprising a frame, a supporting wheel therefor, a pair of shafts journaled for movement on said frame, driving mechanism extending from said wheel to the outer end of one of said shafts, self-interrupting clutch means driven by and mounted adjacent to the inner end of said one shaft, a bearing support for engaging and supporting the driving member of said self-interrupting clutch the inner end of said one shaft being disposed within and supported by the driving member of said clutch, said clutch including a driven member having a crank pin extending axially beyond the end of said shaft, an arm on the other shaft, and a link extending from said crank pin to said arm.

10. In an agricultaural implement, power lift means comprising a driving part having a radially extending flange section and an elongated hub section extending outwardly at opposite sides of said flange section, a driven part including a radially extending flange section and mounted on one end of the elongated hub of said driving part, said driven part being axially shiftable relative to the driving part to effect connection and disconnection of said parts through their radial flanges, abutment means on said elongated hub section at the end thereof adjacent said driven part, spring means acting between said parts for normally disconnecting their flanges, means forming a set of cams on the outer face of said driven part and concentric about the axes of said driving and driven parts, a rockable member mounted between said abutment member and the outer face of said driven part and having at least one end extending radially outwardly beyond said driven part, a spring acting between said driven part and said rockable member, said rockable member having a set of cams cooperating with said first set of cams, whereby said spring serves to rock said rockable member in one direction relative to said driven part whereby said cams serve to force said parts into engagement, and means disposed radially outwardly of said driven part and engageable with the radially outer portion of said rockable member for controlling the latter.

11. An agricultural implement comprising a frame, a pair of shafts journaled for movement on said frame, means for driving one of said shafts, self-interrupting clutch means driven by and mounted adjacent to the inner end of said one shaft, a bearing support for the driving member of said self-interrupting clutch and serving also to support the inner end of said one shaft, said clutch including a driven member having a crank pin extending axially beyond the end of said shaft, an arm on the other shaft, and a link extending from said crank pin to said arm.

12. An agricultural implement comprising a frame, a supporting wheel therefor, a pair of shafts journaled for movement on said frame, driving mechanism extending from said wheel to the outer end of one of said shafts, self-interrupting clutch means disposed at the inner end of said shaft and comprising a driving member having hub extensions extending in opposite directions from a generally radially outwardly extending flanged portion, a bearing support carried by said frame adjacent the inner end of said one shaft and receiving the outwardly directed hub extension of said driving clutch member, the inner end of said shaft being supported in the latter hub extension, a driven clutch member mounted on the other hub extension of said driving clutch member and shiftable axially relative thereto into and out of driving engagement with said flanged portion of said driving clutch member, said driven clutch member having a hub portion mounted on the other hub extension of said driving clutch member, said latter hub extension extending laterally inwardly beyond said hub portion, a clutch control member mounted on said hub portion, an abutment member on the inner end of said laterally inner hub extension on the driving clutch member, said clutch control member reacting against said abutment member for controlling said driving and driven clutch members, an eccentrically disposed stud carried by said driven clutch member and extending laterally inwardly beyond the inner end of said laterally inner hub extension and said abutment member, a crank on the other shaft disposed approximately in alignment with the inner end of said stud, and a link connecting said stud with said crank.

13. An agricultural implement comprising a frame, a pair of shafts journaled for movement on said frame, means for driving one of said shafts, self-interrupting clutch means driven by and mounted adjacent to the inner end of said one shaft, a supporting bar mounted with one end connected to said frame and the other end supported on the other of said shafts, a bearing support mounted on said bar and including a portion receiving the hub of the driving member of said self-interrupting clutch, the inner end of said one shaft being supported in said hub, said clutch including a driven member having a crank pin extending axially beyond the end of said shaft, an arm on the other shaft, and a link extending from said crank pin to said arm.

WILLIAM A. HYLAND.
JOHN H. STARR.

REFERENCES CITED

The following references are of record in the file of this patent:

UNITED STATES PATENTS

| Number | Name | Date |
|---|---|---|
| 1,386,867 | Heylman | Aug. 9, 1921 |
| 1,326,066 | Knapp | Dec. 23, 1929 |
| 2,352,589 | Scarlett | June 27, 1944 |
| 2,135,580 | King | Nov. 8, 1938 |
| 1,014,990 | Ahlborn | Jan. 16, 1912 |
| 960,599 | McStay | June 7, 1910 |
| 1,040,676 | Heylman | Oct. 8, 1912 |
| 2,234,923 | Geraldson | Mar. 11, 1941 |

FOREIGN PATENTS

| Number | Country | Date |
|---|---|---|
| 29,332 | Australia | Oct. 1, 1930 |

Certificate of Correction

Patent No. 2,432,897.

December 16, 1947.

WILLIAM A. HYLAND ET AL.

It is hereby certified that error appears in the printed specification of the above numbered patent requiring correction as follows: Column 6, line 61, claim 9, after the word "support" strike out *for*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*